US008166755B2

(12) United States Patent
Jeanson et al.

(10) Patent No.: US 8,166,755 B2
(45) Date of Patent: May 1, 2012

(54) TURBOCHARGER SYSTEM WITH TURBINE BYPASS VALVE ACTUATED BY MULTIPLE-RATE FLUID PRESSURE ACTUATOR

(75) Inventors: Arthur Jeanson, Thaon les Vosges (FR); Jean-Luc Perrin, Thaon les Vosges (FR); Jean-Yves Bodin, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 571 days.

(21) Appl. No.: 12/352,752

(22) Filed: Jan. 13, 2009

(65) Prior Publication Data

US 2010/0175376 A1 Jul. 15, 2010

(51) Int. Cl.
*F02D 23/00* (2006.01)
*F02D 23/02* (2006.01)
(52) U.S. Cl. ............. 60/602; 60/603; 92/130 D; 92/91; 92/92
(58) Field of Classification Search ............... 60/602, 60/603; *F02D 23/00*
See application file for complete search history.

(56) References Cited

U.S. PATENT DOCUMENTS

| 3,096,614 | A | * | 7/1963 | Silver et al. ............. 60/602 |
| 3,104,520 | A | * | 9/1963 | Cazier et al. ............ 60/602 |
| 3,197,264 | A | | 7/1965 | Hill |
| 4,254,625 | A | * | 3/1981 | Bergstedt et al. ........ 60/602 |
| 4,377,070 | A | * | 3/1983 | Shadbourne ............. 60/602 |
| 4,408,627 | A | * | 10/1983 | Harris .................... 92/130 D |
| 4,875,404 | A | * | 10/1989 | Aldridge .................. 92/130 D |
| 5,183,340 | A | | 2/1993 | Higginbotham et al. |
| 5,393,145 | A | | 2/1995 | Ide |
| 6,017,184 | A | | 1/2000 | Aguilar et al. |
| 6,367,886 | B1 | | 4/2002 | Shaw |
| 6,709,160 | B1 | | 3/2004 | Ward et al. |
| 2001/0043009 | A1 | | 11/2001 | Anderson et al. |

FOREIGN PATENT DOCUMENTS

| DE | 30 37 490 A1 | 4/1981 |
| DE | 39 15 242 A1 | 11/1990 |
| DE | 20 2006 000 886 U1 | 4/2006 |
| GB | 2 063 360 A | 6/1981 |
| WO | WO 95/08054 A1 | 3/1995 |
| WO | WO 2007/060831 A1 | 5/2007 |

OTHER PUBLICATIONS

European Search Report for Application No. EP 10 15 0281 dated Mar. 19, 2010.

* cited by examiner

*Primary Examiner* — Quyen Leung
*Assistant Examiner* — Michael Andrews
(74) *Attorney, Agent, or Firm* — Alston & Bird LLP

(57) ABSTRACT

A fluid pressure actuator for a turbocharger system's turbine bypass valve comprises a piston slidable in a cylinder so as to define a chamber containing a compression spring assembly operable to exert a spring force on the piston. The cylinder can be selectively subjected to a vacuum or pressure for exerting a fluid pressure force on the piston in a direction opposite from the spring force. The spring assembly comprises a first spring arranged to be compressed by the piston throughout a first range of motion of the piston in a compression direction, and at least a second spring arranged to be compressed by the piston throughout a second range of motion that is smaller than and co-terminal with the first range of motion but to be uncompressed during an initial part of the first range of motion of the piston in the compression direction.

18 Claims, 5 Drawing Sheets

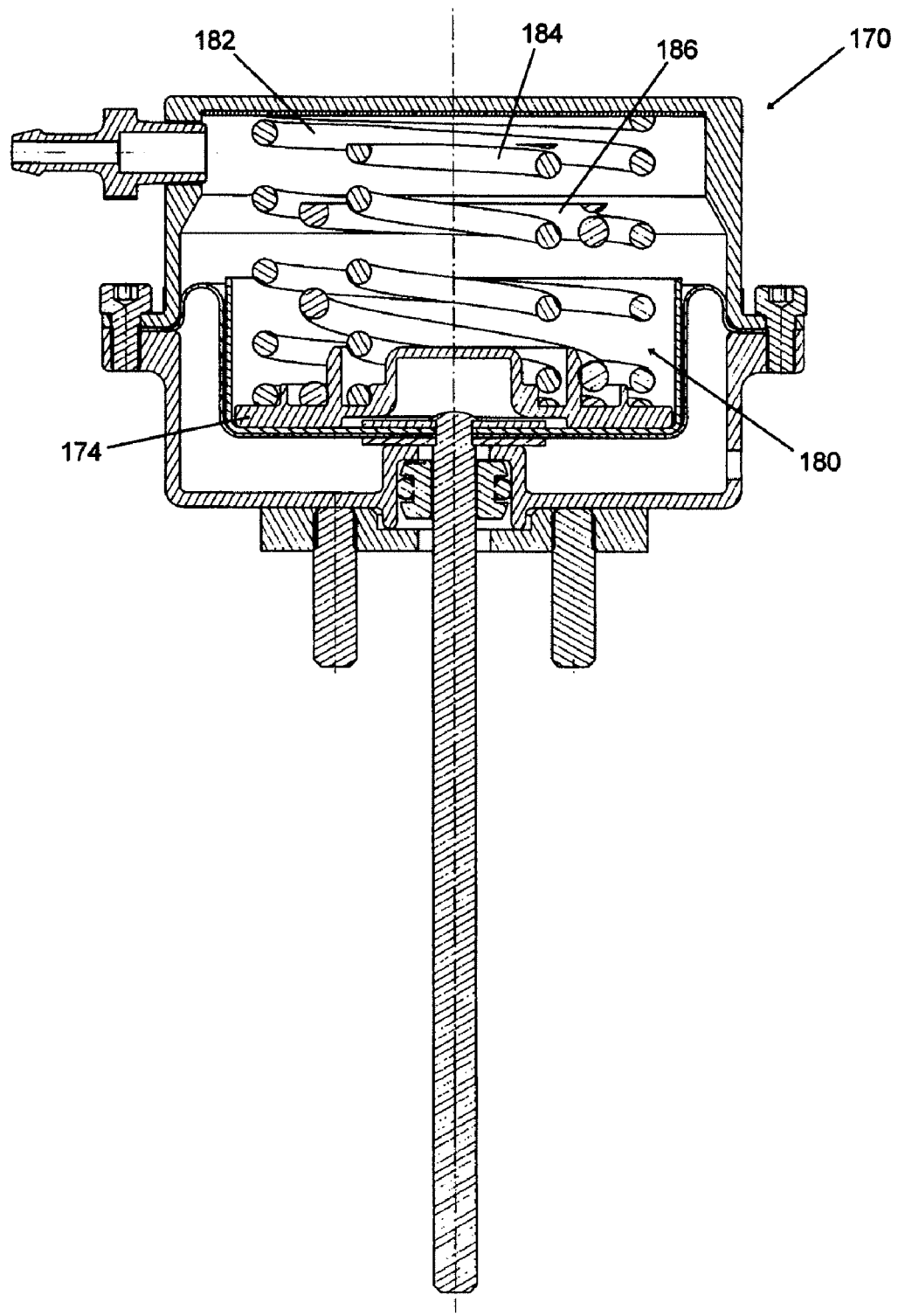
F I G . 6

TURBOCHARGER SYSTEM WITH TURBINE BYPASS VALVE ACTUATED BY MULTIPLE-RATE FLUID PRESSURE ACTUATOR

BACKGROUND OF THE INVENTION

The present disclosure relates to turbocharger systems having a turbine bypass valve for selectively causing exhaust gas from an internal combustion engine either to pass through the turbine of a turbocharger or to bypass the turbine under certain operating conditions. The disclosure relates in particular to a vacuum or pressure actuator for providing the motive force to move the turbine bypass valve between its open and closed positions.

Turbocharger systems for internal combustion engines sometimes have to employ multiple turbochargers arranged either in series or in parallel in order to achieve a high pressure-ratio or high flow capacity at certain operating conditions. At less-demanding operating conditions, however, such large capacity is not required, and therefore it is common to include some type of bypass valve arrangement for bypassing one of the turbochargers when large capacity is not needed. Typically such a multiple-turbocharger system will include a turbine bypass valve arranged for selectively causing exhaust gas to bypass the turbine of one of the turbochargers. The turbine bypass valve may comprise, for example, a swing valve or a butterfly valve. It is common to employ a vacuum actuator for moving the turbine bypass valve. A conventional vacuum actuator essentially comprises a piston or diaphragm arranged within a cylinder to define a chamber that can be subjected either to a vacuum or to ambient pressure for causing movement of the piston within the cylinder. A compression spring is arranged in the chamber for urging the piston in a first direction, for example, to open the turbine bypass valve. The piston is moved in an opposite second direction (for example, to close the turbine bypass valve) by increasing the vacuum in the chamber so that fluid pressure on the piston overcomes the spring force. Reducing the vacuum allows the spring force to overcome the fluid pressure force and move the piston toward the open position.

The present disclosure concerns improvements in such turbocharger systems, and particularly in the actuator that provides the motive force for moving the turbine bypass valve.

BRIEF SUMMARY OF THE DISCLOSURE

The applicant has discovered that conventional vacuum actuators of the type typically employed in turbocharger systems are prone to a problem that negatively impacts the degree of control over the turbine bypass valve's movement. In particular, the applicant has discovered that as vacuum is reduced with a conventional vacuum actuator to move the turbine bypass valve from its fully closed position toward its open position, the initial piston movement is not smooth and well-controlled, but rather the piston tends to suddenly "jump" partway toward the open position. The sudden jump is thought to result from the highly non-linear resistance of the turbine bypass valve to movement as it just begins to open; there is a sudden drop in the resistance when the valve passes a certain point. This sudden jump is undesirable in a turbocharger system because it causes a sudden and uncontrolled change in the flow rate of exhaust gas to the turbine, which can negatively impact the internal combustion engine's performance.

The present disclosure describes an improved fluid pressure actuator for turbocharger systems, and a turbocharger system incorporating such a fluid pressure actuator. In accordance with the present development, a turbocharger system comprises a turbocharger having a turbine driven by exhaust gas from an internal combustion engine and a compressor driven by the turbine for compressing air for delivery to the engine. A turbine bypass valve is arranged with respect to the turbine such that the turbine bypass valve is movable between an open position and a closed position for regulating flow of exhaust gas to the turbine. The system includes a motive device connected to the turbine bypass valve and operable to provide motive force for moving the turbine bypass valve between the open and closed positions, wherein the motive device comprises a fluid pressure actuator.

The fluid pressure actuator comprises a piston slidable in a cylinder, the piston dividing an internal space in the cylinder into first and second chambers, one of said chambers containing a compression spring assembly operable to exert a spring force on the piston in a first direction. The cylinder defines a port into one of the chambers through which the chamber can be selectively subjected to a vacuum or pressure for exerting a fluid pressure force on the piston in a second direction opposite from the first direction such that the piston will move in the second direction when the fluid pressure force exceeds the spring force. The spring assembly comprises a first spring arranged to be compressed by the piston throughout a first range of motion of the piston, and a second spring arranged to be compressed by the piston throughout a second range of motion that is smaller than and co-terminal with the first range of motion but to be uncompressed during an initial part of the first range of motion of the piston in the second direction. By "co-terminal with" is meant that the first and second ranges of motion overlap and have the same end point as the piston moves in the second direction.

Thus, starting with the piston in its open position (i.e., with the spring assembly compressed a relatively small amount), as vacuum or pressure is increased in the cylinder and the piston begins to move toward its closed position, during the initial part of the first range of motion of the piston the fluid pressure force on the piston is opposed by the spring force of only the first spring, and thus the spring force is relatively low. Once the piston has moved a certain distance, the second spring begins to be compressed so that the spring force is the sum of the spring forces of the first and second springs. The fluid pressure actuator thus has a low spring force at the beginning of closing movement and a higher spring force further on in the closing movement of the piston.

Starting with the piston in the closed position, to move the piston toward the open position the vacuum or pressure is reduced until the spring force overcomes the fluid pressure force. Initially, the opening movement is caused by both first and second springs, which are both in compression. In certain embodiments of the fluid pressure actuator, the second spring has a spring constant differing from that of the first spring. For example, in preferred embodiments the spring constant of the second spring is greater than that of the first spring. With such an arrangement, the effective spring constant as the valve opens is relatively high, so that when the force resisting the opening of the valve suddenly drops, the change in spring length corresponding to that force change is relatively small. Accordingly, the valve jumps by a much smaller amount than would be the case with a conventional actuator having a single (lower-rate) spring. After the jump, the second spring is no longer compressed, and further movement toward the open position is caused by the first spring alone.

The spring constant of the second spring can be at least two times, more preferably at least four times, and still more preferably at least six times that of the first spring. In other embodiments, the spring constant of the second spring is seven times, or eight times, or nine times, or from 10 to 25 times, the spring constant of the first spring. However, it is not essential that the spring constants be different; in some embodiments, the springs can have substantially identical spring constants.

In a further embodiment, the spring assembly of the fluid pressure actuator also includes a third spring arranged to be compressed by the piston throughout a third range of motion that is smaller than and co-terminal with the second range of motion but to be uncompressed during an initial part of the second range of motion of the piston in the second direction. In this embodiment, the piston movement toward the second direction is initially resisted by only the first spring, until the second spring begins to be compressed. Further movement of the piston then is resisted by both the first and second springs, until the third spring begins to be compressed. The final portion of the piston's movement then is resisted by all three springs.

In some embodiments, at least one of the second and third springs has a spring constant differing from that of the first spring. Preferably, the spring constant of the second spring is greater than that of the first spring, and the spring constant of the third spring is greater than that of the second spring. However, the spring constants do not have to be different.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 6 depicts an actuator in accordance with a further embodiment of the invention in which the spring assembly has three springs.

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
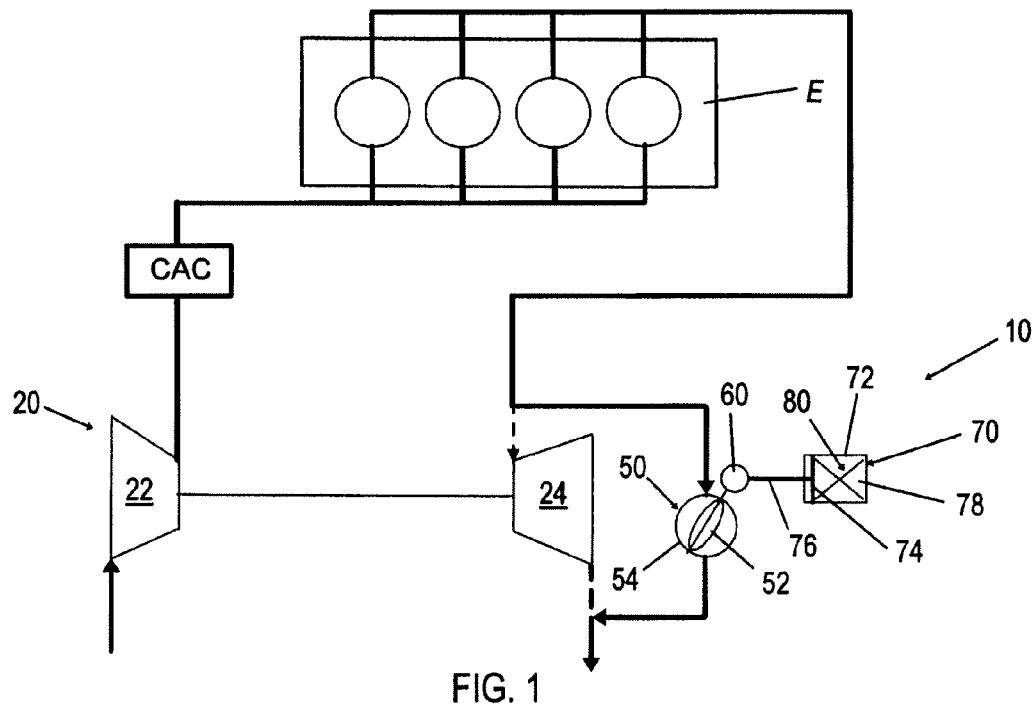
FIG. 1 is a diagrammatic illustration of a turbocharger system having a turbine bypass valve coupled to a fluid pressure actuator, showing the turbine bypass valve open.
Figure 2:
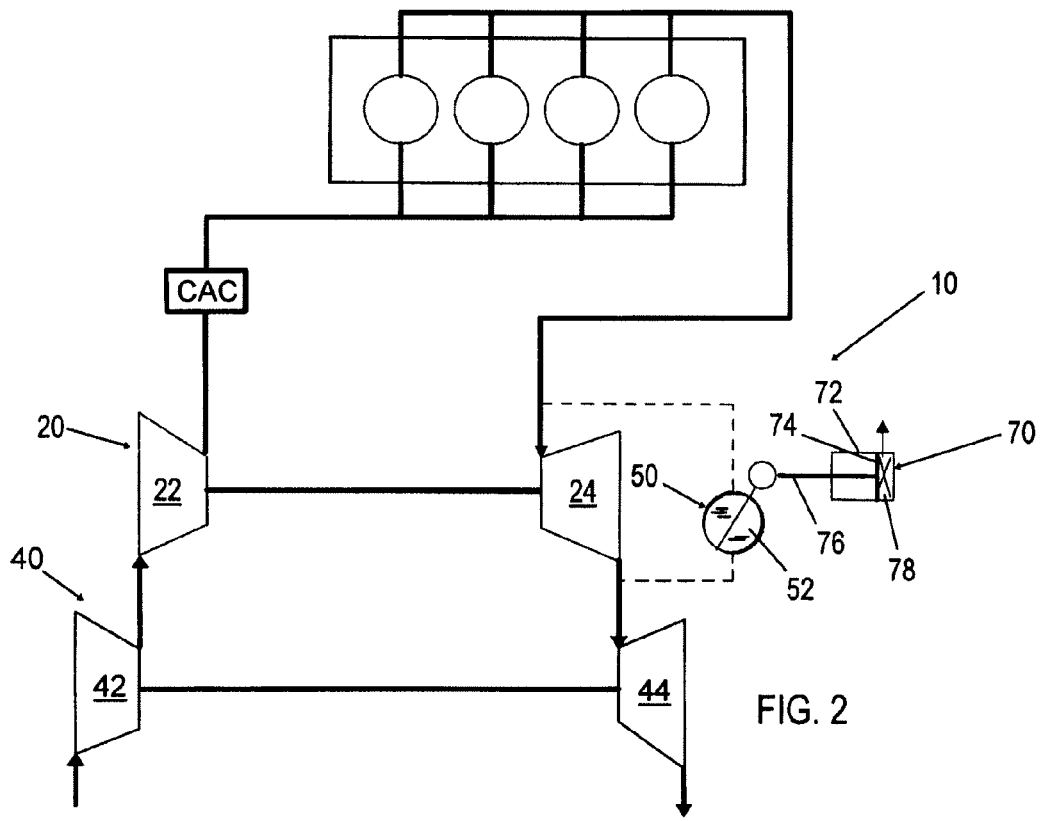
FIG. 2 is similar to FIG. 1, showing the turbine bypass valve closed.

FIGS. 1 and 2 schematically depict a turbocharger system 10 in association with an internal combustion engine E. The turbocharger system 10 includes a high-pressure turbocharger 20 arranged in series with a low-pressure turbocharger 40 (the low-pressure turbocharger being omitted in FIG. 1). The high-pressure turbocharger 20 includes a high-pressure compressor 22 driven by a high-pressure turbine 24 that receives exhaust gas from the engine. The low-pressure turbocharger 40 includes a low-pressure compressor 42 driven by a low-pressure turbine 44 that receives exhaust gas. The system 10 is a series arrangement in which the compressors 22, 42 are arranged in series such that air compressed by the low-pressure compressor 42 is further compressed by the high-pressure compressor 22 and is then supplied to the intake of the engine. Likewise, the turbines 24, 44 are arranged in series such that exhaust gas that is expanded in the high-pressure turbine 24 is further expanded in the low-pressure turbine 44. The system 10 is illustrated with a turbine bypass valve 50 arranged in a bypass passage around the high-pressure turbine 24. It will be understood, however, that this location and arrangement of the turbine bypass valve 50 is solely for explanatory purposes, and in general there may be additional and/or differently arranged bypass valves for bypassing the high-pressure turbine 24, the high-pressure compressor 22, the low-pressure turbine 44, and/or the low-pressure compressor 42. The invention described herein is applicable to any of these bypass valves.

The turbine bypass valve 50 is illustrated in schematic fashion as a butterfly valve having a circular disc-shaped valve member 52 that is disposed in a generally cylindrical valve housing 54 and is rotatable about an axis that coincides with a diameter of the valve member and is perpendicular to and passes through a central longitudinal axis of the valve housing. The valve member 52 is mounted on an axle that is journaled in the housing 54 for rotation. The present invention is not limited to any particular type of turbine bypass valve, however, and other valve types such as swing valves can also be employed with the invention. FIG. 1 depicts the turbine bypass valve 50 in a relatively open position and FIG. 2 depicts it in a closed position. (Although FIGS. 1 and 2 generally depict the exhaust gas flow being top to bottom through the valve 50, the valve 50 itself is illustrated in end view along the flow direction to more clearly show the two positions of the valve member 52.)

Figure 3:
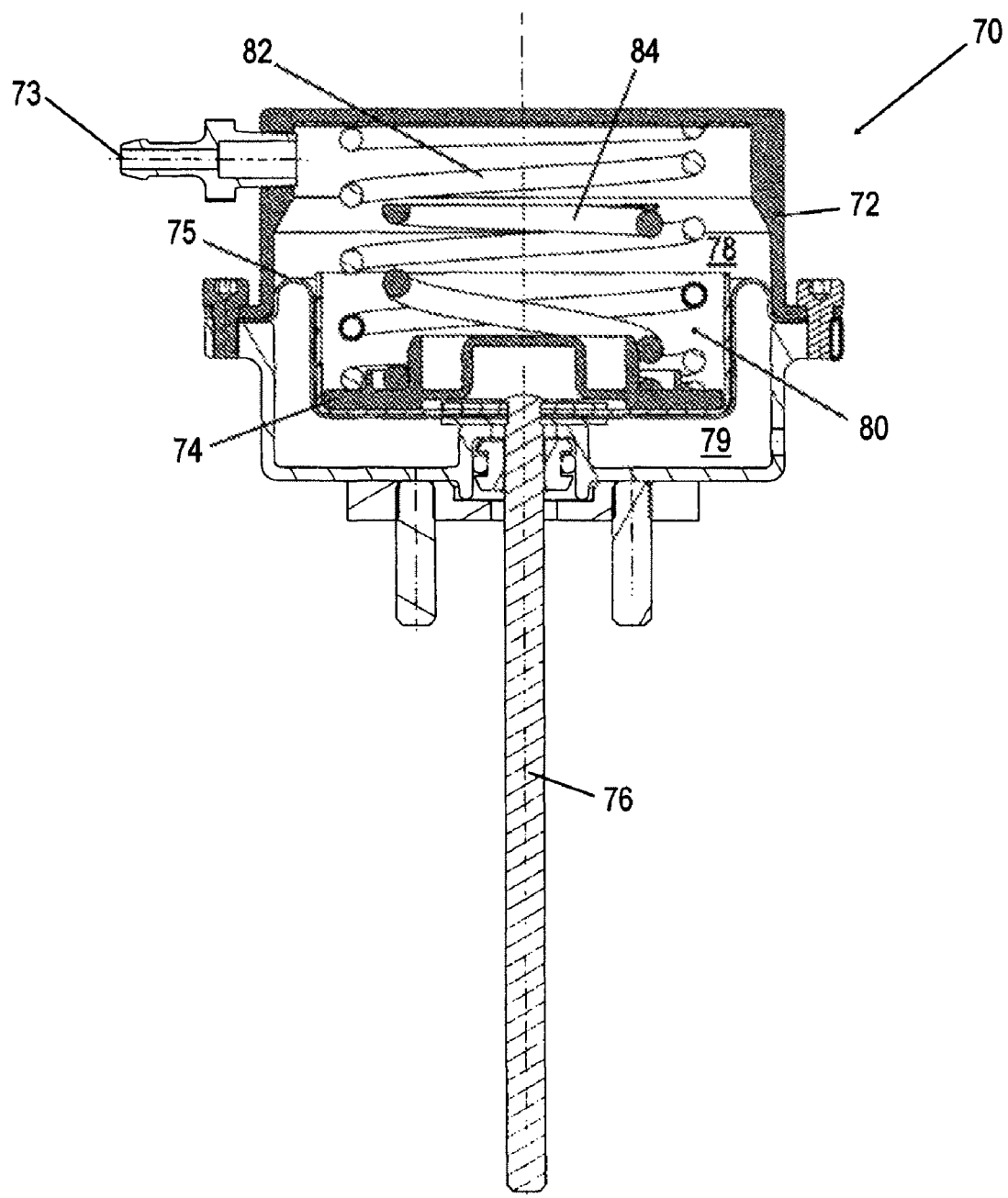
FIG. 3 is a cross-sectional view of an actuator in accordance with one embodiment of the invention, with the piston in a position such that the second spring of the spring assembly is uncompressed.
Figure 4:
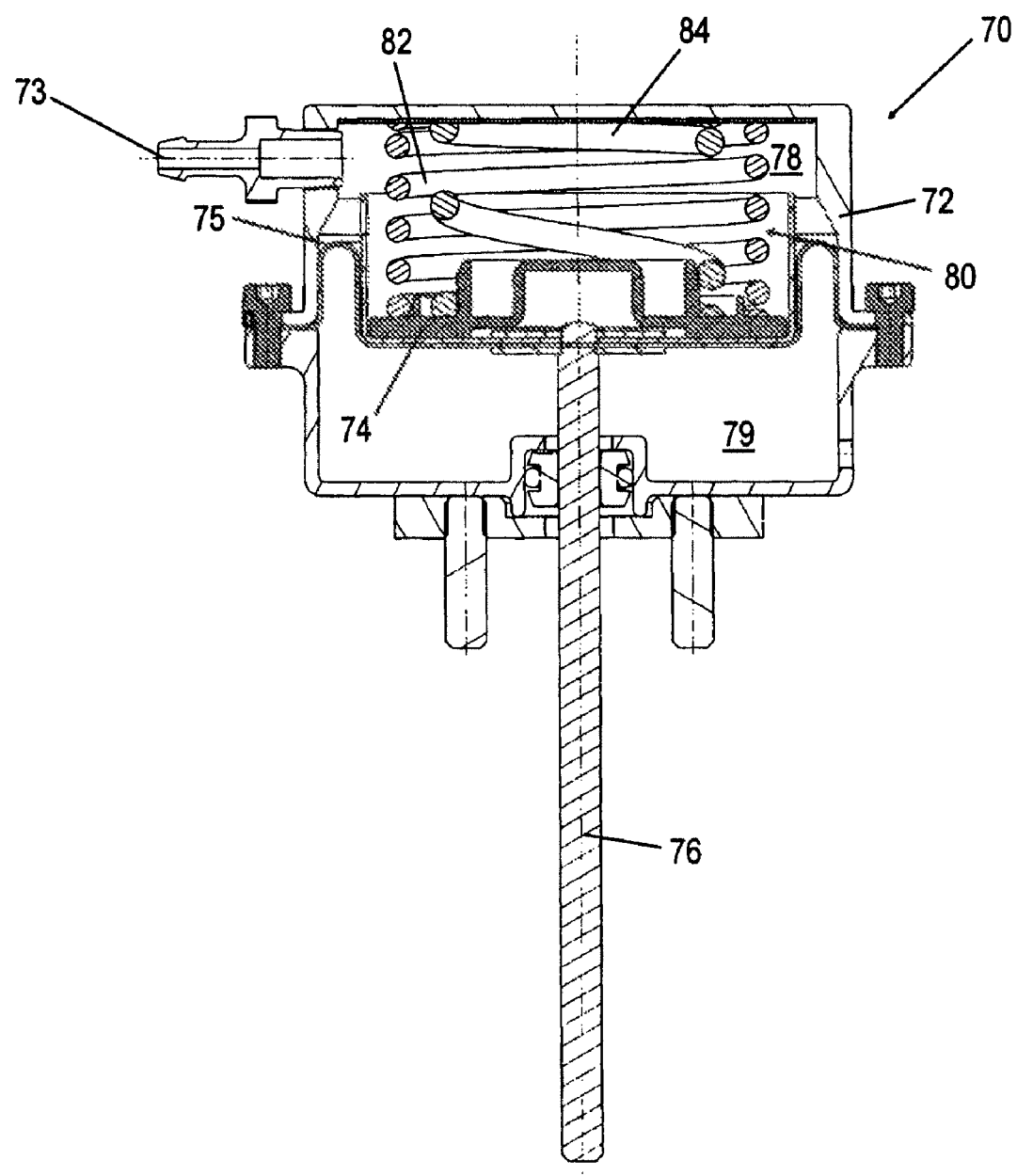
FIG. 4 shows the actuator of FIG. 3 in a position such that second spring of the spring assembly is just beginning to be compressed.
Figure 5:
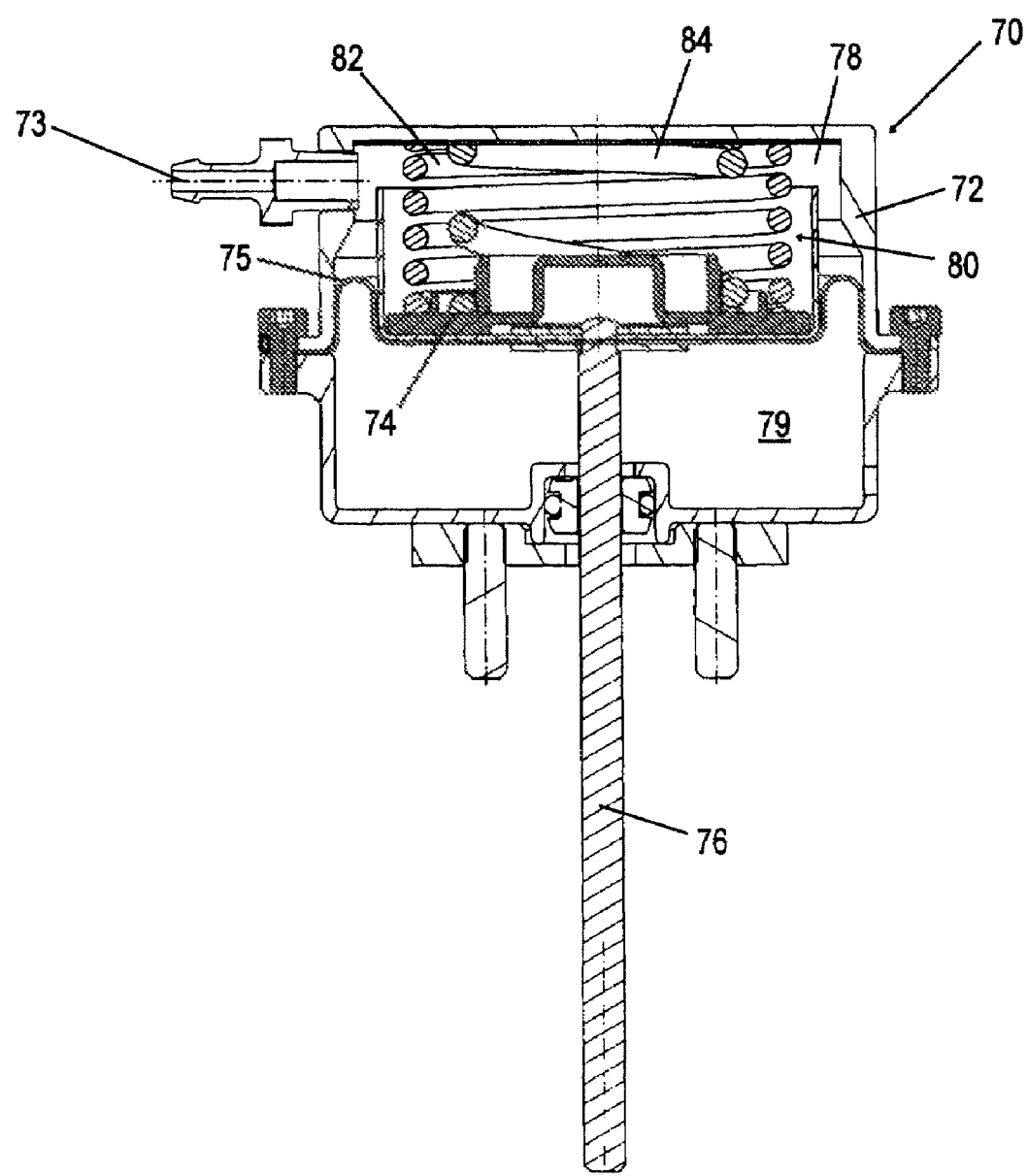
FIG. 5 shows the actuator of FIG. 3 in a position such that second spring of the spring assembly is further compressed.

Motive force for rotating the valve member 52 is provided by a fluid pressure actuator 70 that is coupled with the valve member 52 via a transmission 60 operable to convert linear motion at the input to the transmission into rotational motion at the output of the transmission. The fluid pressure actuator 70 is shown in greater detail in FIGS. 3-5. The fluid pressure actuator 70 comprises a cylinder 72 in which a piston 74 is slidable. The piston includes a piston rod 76 that extends out from the cylinder 72 and is coupled with the transmission 60. A flexible diaphragm 75 is affixed to the piston, and the outer edge of the diaphragm is affixed to the cylinder, such as by being clamped between two parts of the cylinder as shown. The piston 74 and diaphragm 75 divide the internal space in the cylinder 72 into a first chamber 78 and a second chamber 79. A compression spring assembly 80 is contained in the first chamber 78. The actuator 70 shown in the FIGS. 3-5 is a vacuum actuator in which a port 73 for exerting vacuum extends into the first chamber 78, but the invention is also applicable to pressure actuators (in which the port would extend into the second chamber 79 for exerting pressure therein), the essential principle of the invention being the same in each case.

The spring assembly 80 in this embodiment includes a first spring 82 and a second spring 84. The first spring 82 is a compression spring of any suitable type (a coil spring being illustrated) that is long enough that it is always in compression for all positions of the piston 74. FIG. 3 shows the piston 74 at or near one extreme position in which the compressed length of the first spring 82 is a maximum; this piston position can correspond to the fully open position of the turbine bypass valve as in FIG. 1. FIG. 5 shows the piston 74 at or near the other extreme position in which the compressed length of the first spring 82 is a minimum; this piston position can correspond to the fully closed position of the turbine bypass valve as in FIG. 2. FIG. 4 shows the actuator in an intermediate position. To move the piston toward the closed position, vacuum is exerted to partially evacuate the chamber 78. Thus, in the illustrated embodiment, the spring assembly 80 moves the piston in a first direction (toward the bottom in FIGS. 3-5) to open the turbine bypass valve, and vacuum moves the piston in an opposite second direction (toward the top in FIGS. 3-5) to close the valve.

The spring assembly 80 also includes a second spring 84 that has a shorter relaxed (completely uncompressed) length than that of the first spring 82. In fact, the relaxed length of the second spring 84 is less than the maximum length of the variable-volume chamber 78, which occurs when the piston is in the fully open position. Accordingly, the piston 74 does not compress the second spring 84 during an initial part of the range of motion of the piston as the piston moves in the second direction toward its closed position; only the first spring 82 is being compressed during this initial part of the range of motion. FIGS. 3 and 4 illustrate the two end points of this initial part of the first range of motion. The second spring 84 begins to be compressed at an intermediate position of the piston as shown in FIG. 4. Thus, throughout a second range of motion (which is smaller than and co-terminal with the first range of motion in which the first spring 82 is compressed), both springs 82 and 84 are compressed. FIGS. 4 and 5 show the two end points of this second range of motion.

As a result of this arrangement, the spring assembly 80 is a dual-rate spring assembly because the effective spring constant or spring rate (defined as the rate of change of spring force as a function of spring length, dF/dL) during the initial part of the first range of motion when only the first spring 82 is being compressed is smaller than the effective spring rate during the second range of motion when both springs 82 and 84 are being compressed. If the first spring 82 has an uncompressed length $L_1$ and a spring constant $k_1$, and the second spring 84 has an uncompressed length $L_2$ and a spring constant $k_2$, then during the initial part of the first range of motion, the effective spring constant of the spring assembly is clearly equal to $k_1$. Once the second spring 84 begins to be compressed, the total spring force on the piston is the sum of the two spring forces, and the effective spring constant is the sum of the two spring constants, i.e., $k_{eff}=k_1+k_2$.

An advantage of the fluid pressure actuator 70 with dual-rate spring assembly 80, in the particular context of being used for actuating a turbine bypass valve 50 in a turbocharger system generally as described herein, is that as the turbine bypass valve begins to crack open as the piston is moved from the closed position (FIG. 2) toward the open position (FIG. 1), initially both springs 82 and 84 are active and the effective spring constant is relatively high. Accordingly, when the force required to move the valve member suddenly drops at a certain point during the valve opening (as commonly occurs with many valves), the amount of length change of the spring assembly 80 corresponding to that force change is relatively small, and therefore the amount by which the valve member suddenly moves to a more-open position is relatively small. In comparison, if a conventional vacuum actuator having a single (lower-rate) spring were used, the same force change would correspond to a large spring length change and therefore the valve would suddenly move by a larger amount. Additionally, by sizing the two springs appropriately in terms of their lengths and spring constants, the second spring can become inactive (uncompressed) at a desired point along the piston travel toward the open position. For example, the spring assembly can be designed so that the second spring becomes inactive shortly after the valve opening force suddenly drops. Then, for the remainder of the valve opening movement, only the first spring 82 would be active.

In preferred embodiments of the invention, the second spring 84 has a greater spring constant than that of the first spring 82 ($k_2 > k_1$). For example, $k_2$ may be at least two times, or more preferably at least four times, or still more preferably at least six times $k_1$.

In another embodiment, a fluid pressure actuator 170 in accordance with the invention can have a triple-rate spring assembly 180 comprising first, second, and third springs 182, 184, 186. Such an actuator is illustrated in FIG. 6. The first spring 182 is of a length so that the spring is in compression throughout the full range of motion of the piston 174. The second spring 184 is shorter than the first spring and therefore there is a portion of the first range of motion during which the second spring 184 is not compressed. The third spring 186 is shorter than the third spring 184 and therefore there is a portion of the second range of motion (i.e., the range in which the second spring is being compressed) during which the third spring 186 is not compressed. As with the prior embodiment, the three springs can have different spring constants. For example, the first spring 182 can have a relatively low spring constant, the spring constant of the second spring 184 can be greater than that of the first spring, and the spring constant of the third spring 186 can be greater than that of the second spring.

Many modifications and other embodiments of the inventions set forth herein will come to mind to one skilled in the art to which these inventions pertain having the benefit of the teachings presented in the foregoing descriptions and the associated drawings. For example, as noted, the invention applies to both vacuum actuators as illustrated in the drawings, and pressure actuators. A pressure actuator in accordance with the invention is substantially the same as the described vacuum actuator, except that the port into the cylinder extends into the other chamber (the one that does not contain the spring assembly), and the spring force is overcome by positive pressure supplied into this chamber. In other respects, however, the operation of the pressure actuator is the same as for the vacuum actuator. The term "fluid pressure actuator" encompasses both vacuum actuators and pressure actuators. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger system, comprising a turbocharger having a turbine driven by exhaust gas from an internal combustion engine and a compressor driven by the turbine for compressing air for delivery to the engine, a turbine bypass valve arranged with respect to the turbine such that the turbine bypass valve is movable between an open position and a closed position for regulating flow of exhaust gas to the turbine, and motive device connected to the turbine bypass valve and operable to provide motive force for moving the turbine bypass valve between the open and closed positions, wherein the motive device comprises a fluid pressure actuator comprising a piston slidable in a cylinder, the piston dividing an internal space in the cylinder into first and second chambers, one of said chambers containing a compression spring assembly operable to exert a spring force on the piston in a first direction, the cylinder defining a port into one of said chambers through which the chamber can be selectively subjected to a vacuum or pressure for exerting a fluid pressure force on the piston in a second direction opposite from the first direction such that the piston will move in the second direction when the fluid pressure force exceeds the spring force, and wherein the spring assembly comprises a first spring arranged to be compressed by the piston throughout a first range of motion of the piston, a second spring arranged to be compressed by the piston throughout a second range of motion that is smaller than and co-terminal with the first range of motion but to be uncompressed during an initial part of the first range of motion of the piston in the second direction, and a third spring arranged to be compressed by the piston throughout a third range of motion that is smaller than and co-terminal with the second range of motion but to be uncompressed during an initial part of the second range of motion of the piston in the second direction.

2. The turbocharger system of claim 1, wherein the second spring has a spring constant differing from that of the first spring.

3. The turbocharger system of claim 2, wherein the spring constant of the second spring is greater than that of the first spring.

4. The turbocharger system of claim 3, wherein the spring constant of the second spring is at least two times that of the first spring.

5. The turbocharger system of claim 3, wherein the spring constant of the second spring is at least four times that of the first spring.

6. The turbocharger system of claim 3, wherein the spring constant of the second spring is at least six times that of the first spring.

7. The turbocharger system of claim 1, wherein at least one of the second and third springs has a spring constant differing from that of the first spring.

8. The turbocharger system of claim 7, wherein the spring constant of the second spring is greater than that of the first spring.

9. The turbocharger system of claim 8, wherein the spring constant of the third spring is greater than that of the second spring.

10. A fluid pressure actuator for providing motive force to move a turbine bypass valve of a turbocharger system that includes a turbocharger having a turbine driven by exhaust gas from an internal combustion engine and a compressor driven by the turbine for compressing air for delivery to the engine, the turbine bypass valve being arranged with respect to the turbine such that the turbine bypass valve is movable between an open position and a closed position for regulating flow of exhaust gas to the turbine, the fluid pressure actuator comprising:

a piston slidable in a cylinder, the piston dividing an internal space in the cylinder into first and second chambers, one of said chambers containing a compression spring assembly operable to exert a spring force on the piston in a first direction, the cylinder defining a port into one of said chambers through which the chamber can be selectively subjected to a vacuum or pressure for exerting a fluid pressure force on the piston in a second direction opposite from the first direction such that the piston will move in the second direction when the fluid pressure force exceeds the spring force, and wherein the spring assembly comprises a first spring arranged to be compressed by the piston throughout a first range of motion of the piston, a second spring arranged to be compressed by the piston throughout a second range of motion that is smaller than and co-terminal with the first range of motion but to be uncompressed during an initial part of the first range of motion of the piston in the second direction, and a third spring arranged to be compressed by the piston throughout a third range of motion that is smaller than and co-terminal with the second range of motion but to be uncompressed during an initial part of the second range of motion of the piston in the second direction.

11. The fluid pressure actuator of claim 10, wherein the second spring has a spring constant differing from that of the first spring.

12. The fluid pressure actuator of claim 11, wherein the spring constant of the second spring is greater than that of the first spring.

13. The fluid pressure actuator of claim 12, wherein the spring constant of the second spring is at least two times that of the first spring.

14. The fluid pressure actuator of claim 12, wherein the spring constant of the second spring is at least four times that of the first spring.

15. The fluid pressure actuator of claim 13, wherein the spring constant of the second spring is at least six times that of the first spring.

16. The fluid pressure actuator of claim 10, wherein at least one of the second and third springs has a spring constant differing from that of the first spring.

17. The fluid pressure actuator of claim 16, wherein the spring constant of the second spring is greater than that of the first spring.

18. The fluid pressure actuator of claim 17, wherein the spring constant of the third spring is greater than that of the second spring.

* * * * *